(No Model.) 2 Sheets—Sheet 1.
T. L. WISWALL & J. B. FRANK.
RECEPTACLE FOR RECOVERING PRECIOUS METALS FROM SOLUTIONS.
No. 536,981. Patented Apr. 2, 1895.
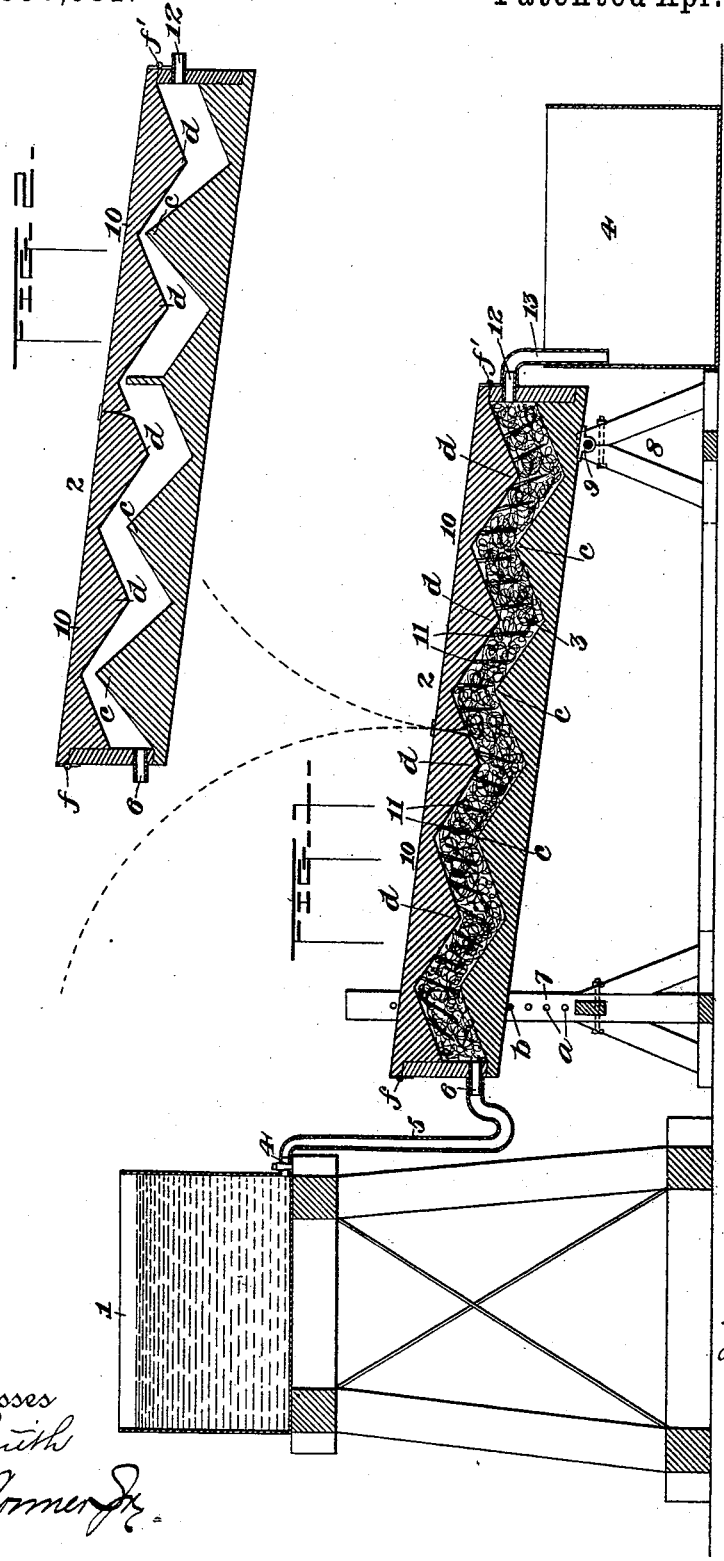

(No Model.) 2 Sheets—Sheet 2.
T. L. WISWALL & J. B. FRANK.
RECEPTACLE FOR RECOVERING PRECIOUS METALS FROM SOLUTIONS.
No. 536,981. Patented Apr. 2, 1895.
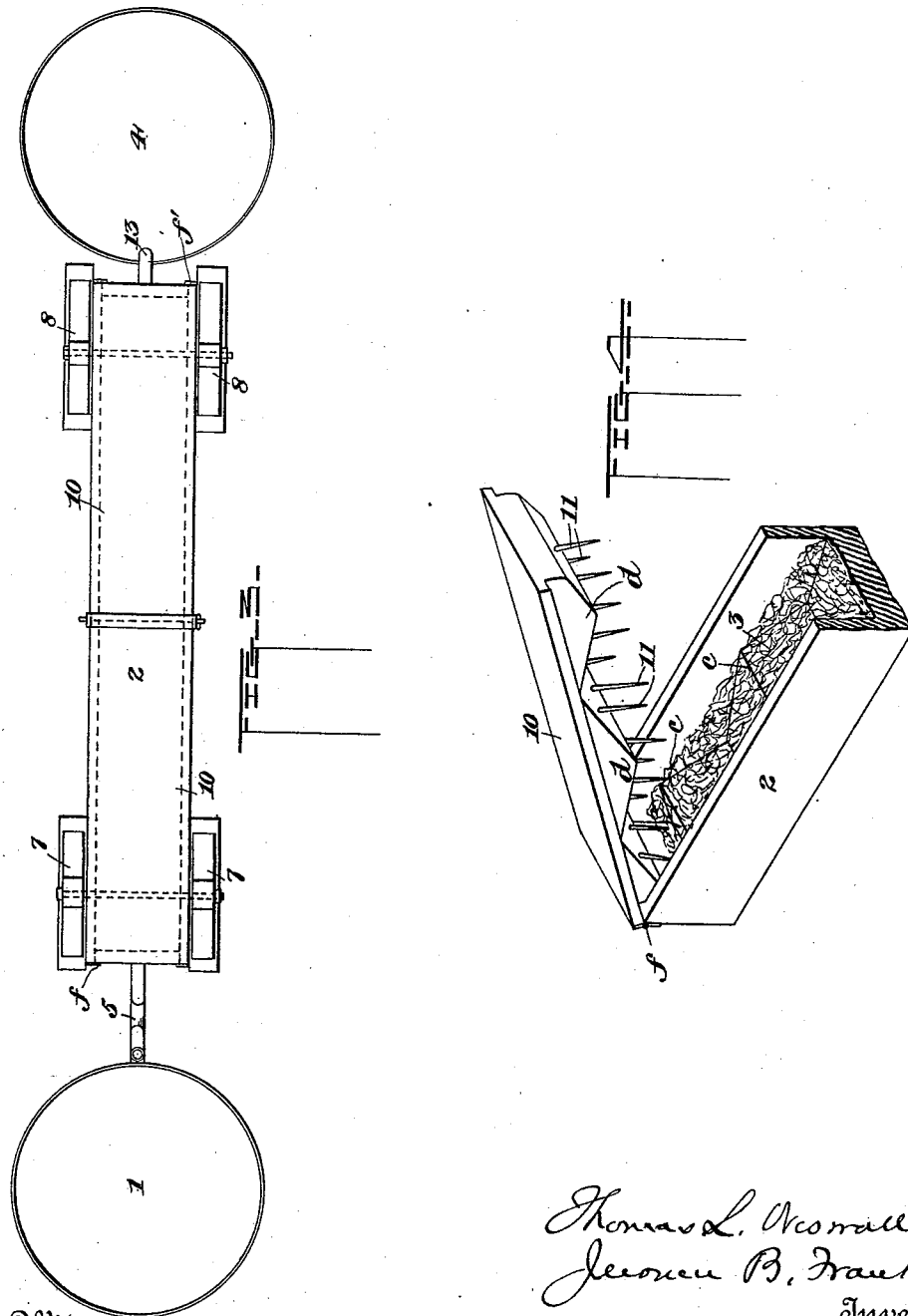

UNITED STATES PATENT OFFICE.

THOMAS L. WISWALL AND JEROME B. FRANK, OF DENVER, COLORADO.

RECEPTACLE FOR RECOVERING PRECIOUS METALS FROM SOLUTIONS.

SPECIFICATION forming part of Letters Patent No. 536,981, dated April 2, 1895.

Application filed August 7, 1894. Serial No. 519,694. (No model.)

*To all whom it may concern:*

Be it known that we, THOMAS L. WISWALL and JEROME B. FRANK, citizens of the United States, residing at Denver, in the county of Arapahoe and State of Colorado, have invented and discovered certain new and useful Improvements in Receptacles for Recovering Precious Metals from Solutions; and we declare the following to be a full, clear, and exact description thereof.

Our invention relates to apparatus wherein the recovery of the precious metals from cyanide and other solutions is effected by passing the solutions through a filtering material, by which the precious metals are precipitated.

Referring to the accompanying drawings, wherein the same indicating letters and numerals point out the same parts in each view, Figure 1, is a longitudinal section of the entire apparatus, through the tanks and the adjustable precipitating box, containing the filtering material. Fig. 2, is a longitudinal section of a modified form of the precipitating box. Fig. 3 is a top plan view of the tanks and box. Fig. 4, is a view in perspective of one of the lids, or sections of the cover of the precipitating box, showing the retaining pegs or pins which prevent the compression and clogging of the fibrous filtering material, and a portion of the subjacent precipitating box.

1, is the storage tank containing the cyanide or other solution charged with the precious metals to be recovered.

2, is the adjustable precipitating box, containing the filtering material.

3, 4, is the sump tank, which receives the spent solution after the precious metals have been extracted from it by the filtering material, 3, in the precipitating box, 2.

The tank, 1, is provided with a nipple and stop-cock, 4, to which is attached one end of the flexible tubing, 5, the other end of said tubing being attached to the nipple, 6, of the precipitating box, 2.

7, is an adjustable standard, having a series of holes, *a*, into which the sustaining pin, *b*, may be inserted for the purpose of raising or lowering the adjacent end of the precipitating box. 8, is a stationary standard for supporting the opposite end of said box, to which it is attached by the hinge, 9.

The adjustable precipitating box, 2, is constructed, first, so that its end nearest the storage tank, 1, may be elevated or lowered by means of the standards 7 and 8, the holes, *a*, the sustaining pin *b*, and the flow of the solution through the box, hastened or retarded as may be desired, and, secondly, said box is constructed so that there extends from end to end, an undulating passage or filtering chamber. This passage, or chamber, is formed preferably by a series of synclinal elevations and depressions. In the drawings these elevations in the bottom of the box, are lettered, *c*, and those at the top, *d*. There may be as many changes of direction in the path of the passage as may be desired, and the angles of the passage at the top and bottom of the passage may be the same as shown in Fig. 1, or they may be of different angles as shown in Fig. 2, wherein the apex, *e*, of angular bottom, *c*, reaches nearly to the top of the filtering chamber. The object of fashioning the filtering chamber into said undulating passage is to secure the entire precipitating capacity of the filtering material in the least possible space and at the same time afford means of easy access to every part thereof, the latter advantage being secured by the removable cover, 10, formed by two or more lids, connected to the box, by the hinges *f, f'*, and opening outward as indicated by the dotted lines. The under part of the lids forming the cover have angular structures which form the upper limit of the filtering chamber or passage, and are provided with the retaining pegs, or pins, 11, sharpened at the end and arranged preferably on arcs of circles having the hinges, *f*, and *f'*, as centers, so that when the lids of the cover 10, are closed, said retaining pins extend downward from the under side thereof into the filtering material within the undulating passage, the object being to divide the whole mass of filtering material into several independent masses and to prevent the material from compressing, clogging, or being carried along the passage by the flowing of the solution. The sides of the passage are formed by the external sides of the precipitating box.

At the end of the precipitating box, is the nipple, 12, to which is attached the conduit, 13, through which the spent solution is discharged into the sump tank, 4.

Heretofore in processes of this nature, the cyanide solution containing precious metals have been passed through filters of various forms, generally one or more tanks, sub-divided by vertical partitions and the filtering chamber has not been accessible along the whole path of the percolation of the solution. In those forms of apparatus also, the partitions do not divide the filtering material into small enough independent masses, and harmful compression and clogging of the material results. Our invention, in contradistinction from all other apparatus furnishes for the precipitation of the precious metals, a passage conveniently accessible at all times and at all points from end to end, provides means for sub-dividing the filtering material into independent masses sufficiently small as to prevent clogging and compression of the material and retaining it in the place of its original deposit in the precipitating box. As the solution which first comes in contact with the filtering material is first deprived of its precipitate the filtering material at that end of the box first reaches the limit of active precipitation, while the material farther along retains more active precipitating qualities. It is quite important therefore in order to fully utilize the whole mass of material, from time to time, to reverse the situation of the filtering material. This operation is facilitated by our means of readily exposing the passage throughout its entire length. The arrangement of cover with its under side forming the upper part of the passage, prevents the oxidation and decomposition of the filtering material.

Having thus described our invention and discovery, what we claim, and desire to secure by Letters Patent, is—

1. In apparatus for the extraction of precious metals from solutions, the precipitating box herein described, having an undulating, sinuous passage from end to end, comprising a series of alternate angular depressions and elevations, provided with a series of retaining pins, attached to the interior of said precipitating box, and extending into the precipitating, filtering material within said passage, substantially as described.

2. In apparatus for the extraction of precious metals from solutions, a vertically adjustable precipitating box, having an undulating, sinuous passage from end to end, and provided with a series of retaining pins, attached to the interior of said precipitating box, and extending into the precipitating, filtering material within said passage, substantially as described.

3. In apparatus for the extraction of precious metals from solutions, a precipitating box having an undulating, sinuous passage from end to end for the reception and retention of the precipitating material, and with retaining pins as described extending from the interior of said box into the mass of precipitating material, provided with the above described cover, attached to said box by hinges as described, the under surface whereof when closed, forms the upper limit of the said undulating, sinuous passage, substantially as herein above set forth.

4. In apparatus for the extraction of precious metals from solutions, the storage tank, 1, the sump tank, 4, with the intermediately described precipitating box, 2, said precipitating box being provided with an internal, undulating, sinuous passage for the reception of a precipitating material with retaining pins, 11, extending from the interior of said box into said precipitating material, together with the above described cover, 10, as and for the purposes indicated, substantially as described.

In testimony whereof we have hereunto set our names in the presence of the subscribing witnesses.

THOMAS L. WISWALL.
JEROME B. FRANK.

Witnesses:
WM. W. BIRD,
W. L. COOPER.